United States Patent
Aichinger et al.

(10) Patent No.: US 8,182,567 B2
(45) Date of Patent: May 22, 2012

(54) METHOD AND DEVICE FOR COARSE SEPARATION OF SOLID PARTICLES FROM SOLID-LADEN GASES

(75) Inventors: Georg Aichinger, Asten (AT); Harald Bauernfeind, Linz (AT); Johann Wurm, Bad Zell (AT)

(73) Assignee: Siemens Vai Metals Technologies GmbH (AT)

( * ) Notice: Subject to any disclaimer, the term of this patent is extended or adjusted under 35 U.S.C. 154(b) by 169 days.

(21) Appl. No.: 12/809,147

(22) PCT Filed: Dec. 19, 2008

(86) PCT No.: PCT/EP2008/010924
§ 371 (c)(1), (2), (4) Date: Jun. 18, 2010

(87) PCT Pub. No.: WO2009/083186
PCT Pub. Date: Jul. 9, 2009

(65) Prior Publication Data
US 2011/0038772 A1    Feb. 17, 2011

(30) Foreign Application Priority Data
Dec. 21, 2007   (AT) .................. A 2101/2007

(51) Int. Cl.
*B01D 45/12*    (2006.01)
(52) U.S. Cl. ............ 55/459.1; 55/428; 96/372; 95/271; 423/215.5; 422/145

(58) Field of Classification Search .............. 55/459.1, 55/428; 96/372; 95/271; 423/215.5; 422/145
See application file for complete search history.

(56) References Cited

U.S. PATENT DOCUMENTS

| | | | |
|---|---|---|---|
| 3,808,401 A | 12/1974 | Fiore et al. | |
| 4,606,739 A * | 8/1986 | Brannstrom | 95/271 |
| 7,144,447 B2 | 12/2006 | Nagl et al. | |
| 2008/0216655 A1 * | 9/2008 | Vimalchand et al. | 95/271 |

FOREIGN PATENT DOCUMENTS

| | | |
|---|---|---|
| DE | 2 331 722 A | 2/1973 |
| DE | 100 50 651 A1 | 4/2002 |
| DE | 101 23 297 A1 | 3/2003 |
| EP | 0 130 668 A | 1/1985 |
| EP | 1 397 521 A2 | 3/2004 |
| JP | 2003-240209 A | 8/2003 |
| WO | WO 02/103063 A2 | 12/2002 |

OTHER PUBLICATIONS

International Search Report dated Jul. 3, 2009, issued in corresponding international application No. PCT/EP2008/010924.

* cited by examiner

*Primary Examiner* — Jason M Greene
*Assistant Examiner* — Dung H Bui
(74) *Attorney, Agent, or Firm* — Ostrolenk Faber LLP

(57) ABSTRACT

The invention relates to a method and a device for the coarse separation of solid particles from solid-laden gases. The invention further relates to a method for treating particulate feed materials by means of treatment gases in a reactor, particularly in a fluidization zone at an increased temperature. Due to a blind hole-like line extension, it is possible to separate solid particles from a solid-laden gas.

23 Claims, 3 Drawing Sheets

METHOD AND DEVICE FOR COARSE SEPARATION OF SOLID PARTICLES FROM SOLID-LADEN GASES

CROSS REFERENCE TO RELATED APPLICATION

The present application is a 35 U.S.C. §§371 national phase conversion of PCT/EP2008/010924, filed Dec. 19, 2008, which claims priority of Austrian Application No. AT2101/2007, filed Dec. 21, 2007, the disclosure of which is incorporated by reference herein. The PCT International Application was published in the English language.

BACKGROUND TO THE INVENTION

The invention relates to a method and a device for the coarse separation of solid particles from solids-laden gases. The invention further relates to a method for treating particulate feed materials by means of treatment gases in a reactor, in particular in a fluidization zone at elevated temperature.

It is known from EP 1 397 521 that solids-laden treatment gases discharged from a reactor for the treatment of particulate material are supplied to a separating means, such as for example a cyclone. Owing to the process in a fluidization zone, such as for example in a fluidized bed, solids are discharged with the treatment gas. In the cyclone this solid is separated from the treatment gas, the solid being returned to the reactor. A drawback of this is that large particles can lead to clogged feed devices during the return of the solids to the reactor.

SUMMARY OF THE INVENTION

It is therefore an object of the invention to provide a method and a device which allow safe separation of solids from a solids-laden gas and avoid the aforementioned drawbacks from the prior art.

The object according to the invention is achieved in accordance with the device according to the invention for coarse separation of solids from a solids-laden gas.

The device according to the invention allows solids to be separated from a solids-laden gas. Solids frequently issue with treatment gases from reactors which are used for the reduction of a particulate material. In particular during operation of a fluidization zone, it is known that solids are discharge together with the treatment gas. These solids have to be separated from the treatment gas and can be returned to the reactor. Owing to the fluidization zone, very marked discharges can occur, even relatively large solid particles being entrained.

There is at least one feed line extending up from a reactor and the feed line receives a treatment gas and solids entrained with the gas. At a location along the feed line below a closed top end thereof a drain line is connected. It at least joins to the feed line at the location in an arcuate arrangement thereof. Above the location along the feed line, there is a blind hole-type projection of the feed line into which the particulate material travels due to its inertia.

As a result of the device according to the invention, the solid particles discharged or cast out of a reactor are carried into the blind hole-type line projection while the gas flows into the arcuate drain line. This prevents the coarse solid particles from flowing away with the gas. They remain substantially perpendicular to the reactor top side or oblique to the reactor top side arranged feed line, so that coarse separation takes place immediately. It is advantageous in this regard that the device makes do without movable parts and that solid particles remain securely in the feed line. The device according to the invention allows the discharge of solid particles, in particular of coarse particles, through the drain line to be substantially avoided, so that solid particles do not give rise to problems during further treatment of the solids-laden gas.

According to a preferred embodiment, the position of the drain line, which is arcuate at least along certain portions thereof, along the feed line is selected in such a way that the length of the line projection above the location of the drain line along the feed line corresponds substantially to the height along the feed line of the arcuate drain line. The adaptation of the length of the line projection allows the space which the solid particles enter to be adapted in accordance with operating parameters such as for example operating pressures. The length of the line projection is defined in accordance with the flow velocity and the volume flow of the solids-laden gas. As the arcuate drain line influences the flow resistance, it has been found to be an advantageous solution if the length of the line projection corresponds substantially to the height of the drain line, that is the height of the cross-section of the drain line.

According to a further preferred embodiment, the length of the line projection corresponds substantially to 0.3-3 times, in particular 0.5-1 times, the clear width of the feed line. The combination of the clear width and length allows extensive coarse separation to be achieved in accordance with the size of the solid particles. This utilizes the inertia of the solid particles.

According to the invention, the curvature of the arcuate drain line, in the form of an arc of a circle or an arc constructed from straight segments, has a radius of approximately 3-5 times the clear width of the arcuate drain line. This embodiment has proven advantageous with regard to the flow properties and the fall in pressure associated with the deflection. Alternatively, it is possible to construct the arc form using a plurality of segments. This is a cost-effective alternative to the arc of a circle form.

According to a specific configuration of the device according to the invention, the clear widths of the feed line and the arcuate drain line are substantially the same. As a result, the inner flow cross section is substantially constant, thus allowing the fall in pressure in the device also to be kept low. This is advantageous also with regard to subsequent units for the treatment of the solids-laden gas.

According to an advantageous configuration of the device according to the invention, the cross sections of the feed line and/or the arcuate drain line are circular, said lines having, in the region in which the blind hole-type projection opens into the arc, flat wall portions comprising ribs for reinforcement. As a result of the circular cross section, advantageously low flow resistance is attained in the device. In the region of the arc, the blind hole-type line projection produces two flat wall portions. These flat wall portions are reinforced in the configuration of the pressurized line by the arrangement of ribs.

A further possible configuration of the device according to the invention provides for a lid at a top end of the blind hole-type line projection to have a flat inner surface arranged horizontally and/or normally to the axis of the feed line, or to have an arched surface corresponding to a dished bottom or a spherical cap or the like. The term "dished bottom" refers to a dome shape having a smaller curvature near the edge and a larger central curvature.

The feed line can be arranged either perpendicularly to the reactor type side or obliquely to the top side or else formed in an S-shaped manner in order to reinforce the deflection.

Solid particles are, in the case of reactors having a fluidization zone, often discharged or else cast out of the reactor together with the treatment gas at very high velocities. Thus, these solid particles strike, in some cases at high velocity, the lid in the line projection and are reflected thereby, so that gravity causes the solid particles to return to the reactor via the feed line. Owing to the characteristics of many reactors with a fluidization zone, solid particles are cast out not continuously but rather only under specific pressure situations. This ensures that discharged solid particles enter only the feed line and the line projection or fall back into the reactor. For this purpose, it is conventional to arrange the device according to the invention above a reactor.

According to the invention, in the drain line, for cooling the prepurified gas, a connection is provided for introducing a cooling gas flow into the prepurified gas. This permits on the one hand the setting of a targeted temperature in the gas in accordance with the device and thus preparation for the further treatment of the solids-laden gas.

According to a specific configuration of the device according to the invention, a closable opening is provided in the feed line, in the region of the arcuate drain line, for internal cleaning, in particular for eliminating deposits. If the device is used under hot, solids-laden gas, deposition or caking-on can occur. The opening easily allows internal cleaning or elimination of such caking-on; it also allows the device to be checked.

The method according to the invention for the coarse separation of solid particles from solids-laden gases is distinguished by a simple design. Solids-laden gases are supplied at an end side via a feed line of the device according to the invention. The feed line is closed at its other end side by means of a lid. An arcuate drain line on the feed line is arranged so as to form a blind hole-type line projection for receiving solid particles, wherein solids introduced into the feed line are carried, owing to their inertia, into the line projection and in this case at least partly separated from the gas. The gas is drawn off with remaining solid particles via the drain line. As a result, only very fine solid particles can enter the arcuate drain line with the gas, so that the majority of the solids remain in the feed line. However, above all, the method prevents coarse solid particles from entering the drain line with the gas. This is a significant advantage, as solid particles above all having grain sizes of greater than 5-10 mm can cause significant problems during subsequent steps for the treatment of the gas. It is advantageous in this regard that the solid particles are separated utilizing the inertia, thus obviating the need for deflections or complex method steps.

According to a particularly advantageous configuration of the method according to the invention, the solids separated in the line projection are discharged again, owing to gravity, via the feed line. This simplest solution not only causes safe removal of the separated solid particles but also eliminates the need for corresponding devices for removal.

A possible configuration of the method according to the invention provides for, during the discharge of the separated solids via the feed line, the velocity of fall of the solids in the line projection to be greater than the gas velocity of the solids-laden gas in the feed line. In other words, while the velocity of fall of the solids is greater than the gas velocity, the solid particles can be discharged through the feed line.

A further configuration of the method according to the invention provides for separated solids to be reflected on the lid of the line projection and cast back into the feed line. At high gas or solid particles velocities, the particles strike the lid at high velocity and then fall back into the feed line.

In accordance with one configuration of the method according to the invention, a cooling gas flow is added to the prepurified gas for cooling. Once the coarse separation has been carried out, the prepurified gas can be thermally adjusted for further treatment. This takes place by adding a cooling gas flow, so that for example very hot gases can be cooled.

According to an advantageous configuration of the method according to the invention, solids remaining in the prepurified gas are separated in a further separating means. Owing to the coarse separation which has already taken place and if appropriate to a reduction in the gas temperature, the gas can be optimally prepared for subsequent separating means, so that the separating means attains optimally high efficiency and trouble-free operation. In particular if cyclone separators are used, it is necessary to lower the temperature in the case of hot gases accordingly and to adhere to a specific flow velocity. As a result of the previously carried-out coarse separation, coarse solid particles are in this case safely separated and a sufficiently high flow velocity maintained, so that optimum separation is attained in a cyclone or other separating means.

The object according to the invention is furthermore achieved in accordance with the method according to the invention for treating particulate feed materials The method according to the invention for treating particulate feed materials, in particular fine ores, is carried out by means of treatment gases in a reactor, in particular in a fluidization zone, and at elevated temperature. The solids-laden treatment gas is discharged from the reactor as a result of reactions in the reactor, which can in some cases have eruption-type sequences, and the gas is supplied to a device according to the invention.

The operation of fluidization zones is known repeatedly to lead in the reactor to pressure peaks which can result in not only dust and small solid particles but rather also larger particles, which have a particle size of greater than 5-10 mm, being cast out of the reactor. Particles of this type are potential causes of disturbance, because caking-on, deposition, but also a reduction in flow cross sections down to clogging, can occur. The method according to the invention avoids these problem areas.

The solids-laden treatment gases are supplied via the feed line, wherein solids introduced into the feed line are carried, owing to their inertia, into the line projection and separated at least partly from the treatment gas. The prepurified treatment gas is drawn off via the drain line. The solids separated in the line projection are returned, owing to gravity, to the reactor via the feed line. This ensures that the losses resulting from cast-out solid particles, such as for example fine ores or else fine iron ores, can be kept low.

According to a particularly advantageous configuration of the method according to the invention, solids remaining in the prepurified treatment gas are separated in a further separating means, these solids being returned to the reactor via an injector. This allows almost all of the particles discharged with the treatment gas to be returned to the reactor and thus to the process. Losses of valuable substances, such as for example ore, can thus be kept very low.

According to a further particularly advantageous configuration of the method according to the invention, the method is a reduction method. In the case of reduction methods, partly or extensively reduced material, such as for example ores or else iron ore, discharged with the treatment gas can lead to significant losses, as the valuable substance/reduced material has to undergo complex treatment and be reintroduced. The method allows this to be largely avoided.

BRIEF DESCRIPTION OF THE DRAWINGS

The invention will be described in greater detail based on the example of a possible configuration. In the drawings.

DESCRIPTION OF PREFERRED EMBODIMENTS

Figure 1:
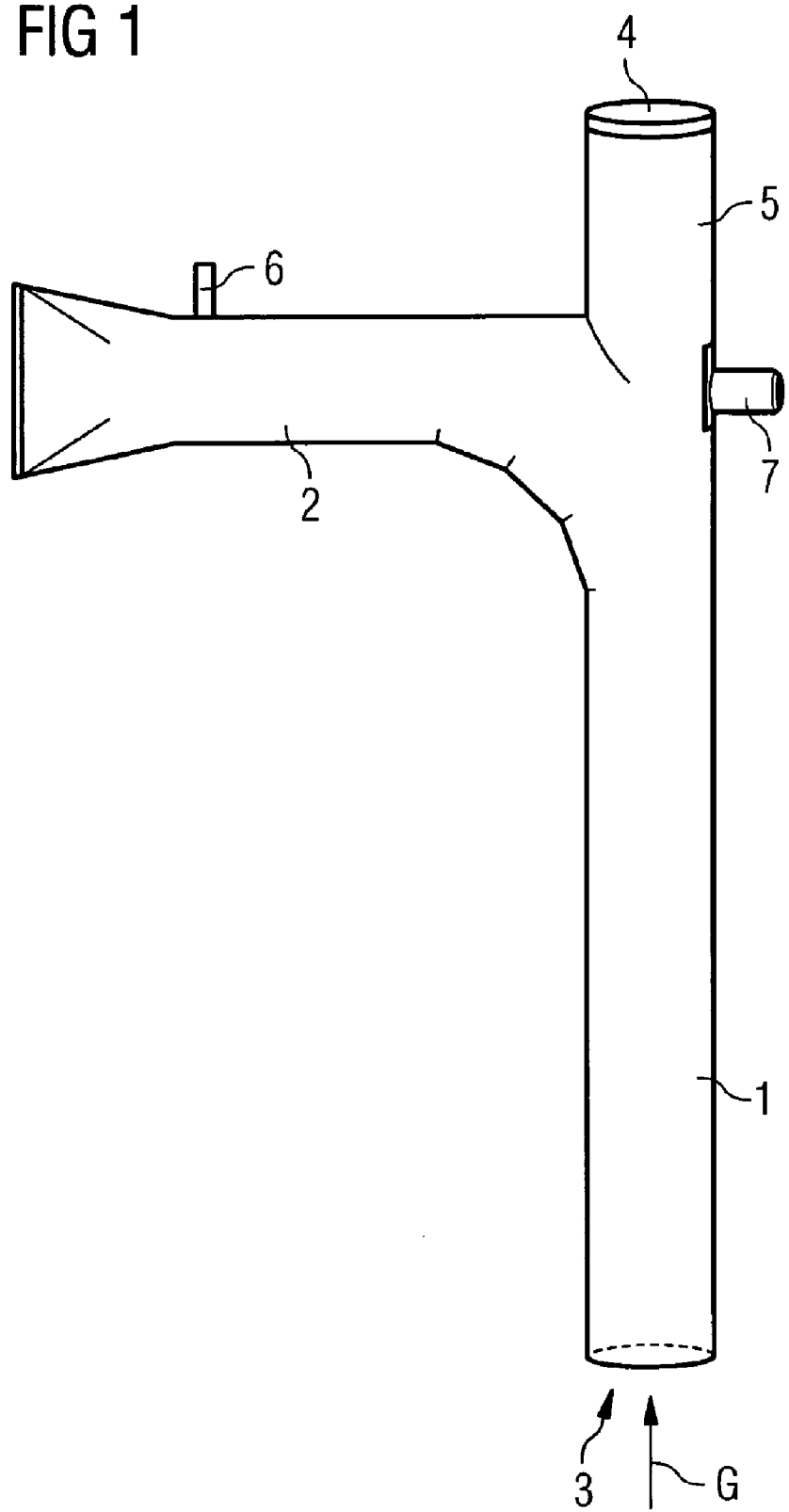
FIG. 1 shows a possible configuration of a device according to the invention for coarse separation.

FIG. 1 shows a substantially perpendicularly arranged feed line 1 which is connected via a line to a generator for solids-laden gases. A conventional arrangement provides the device with the feed line 1 above a generator of this type (reactor 8, see FIG. 2). In a large number of metallurgical methods, such as for example reduction methods or else metallurgical/thermal methods, fine substance particles occur with process gases of the method (treatment gases). If said particles are small, they are entrained with gas flows, in particular at high gas velocities, such as often occur. For example, it is known that, in the case of fluidized bed methods based on a fluidization zone, eruption-type movements, coupled to high gas velocities, occur again and again in the fluidization zone. These movements lead via the lines to the discharge of the treatment gas, thus producing solids-laden gases G, the further treatment of which is complex and cost-intensive. In the case of the discharge of solids from a reactor with a fluidization zone, the solids-laden gas G enters the device according to the invention via the feed line 1. In this case, the solid particles are cast into the blind hole-type space formed by the line projection 5. Owing to the inertia of the solid particles, the majority of the solid particles remain in the line projection 5 and do not enter the arcuate drain line 2.

Gravity causes the solid particles remaining in the line projection to return via the feed line to the reactor from which they were cast out.

Thus, no means are necessary for the discharge of the separated solid particles from the device.

The drain line 2 is formed in an arcuate manner in the region of the opening into the feed line 1 in order to allow unimpeded gas flow. The arcuate drain line 2 can be formed in any desired manner at its free end in order to allow a connection to further treatment means.

Figure 2:
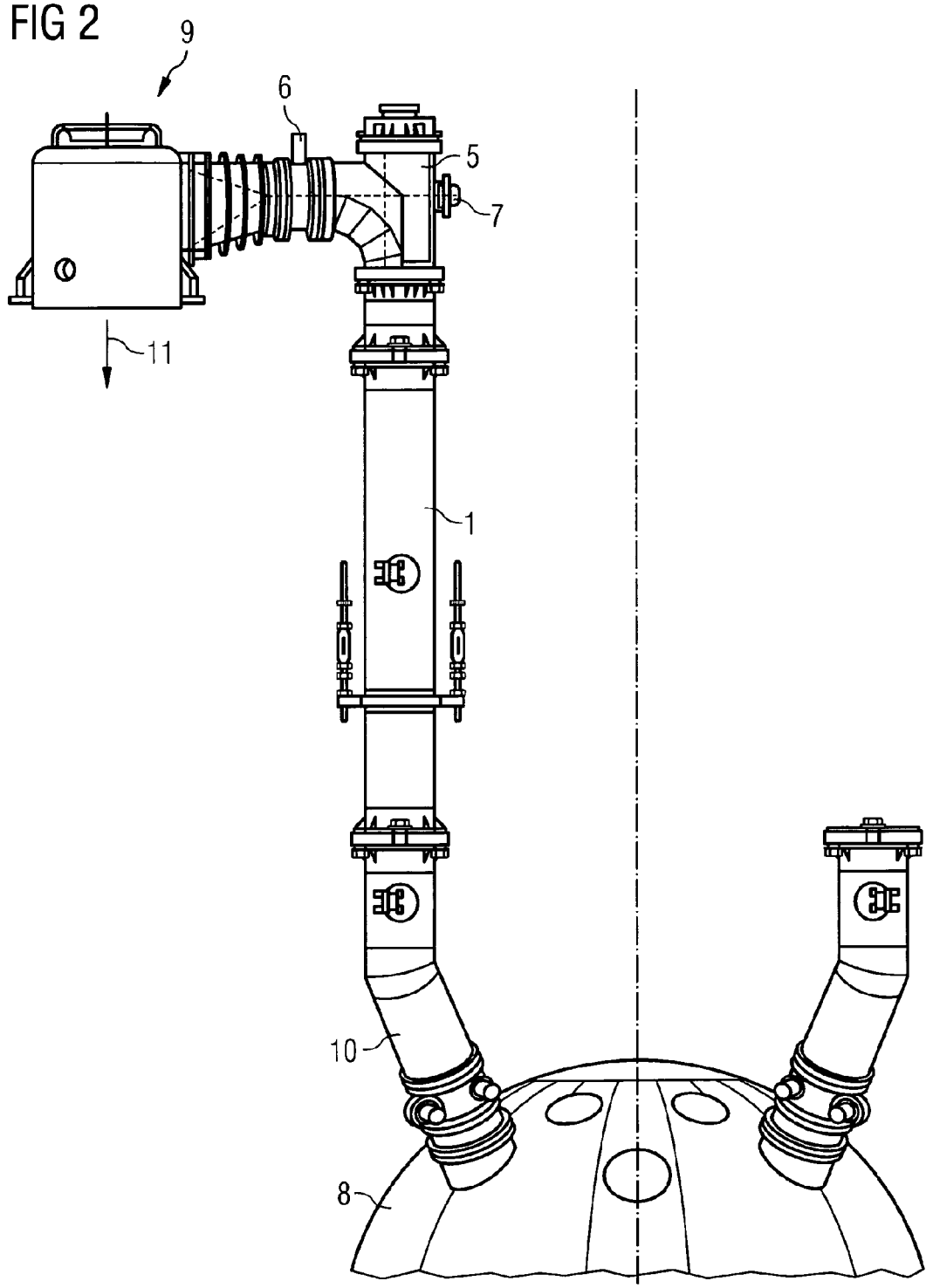
FIG. 2 shows the arrangement of the device according to the invention above a reactor for the thermal/metallurgical treatment of a material.

According to FIG. 2, the arcuate drain line can be connected to a further separating means, such as for example a cyclone 9. This provides an at least two-stage separation, with a coarse separation and a subsequent fine separation and if appropriate a return of the solid particles separated in the second stage to the reactor. Conventionally, a cooling gas is introduced via a connection 6 into the gas which has already been prepurified in the preseparation, the temperature of the gas being adapted, usually cooled, accordingly. As is indicated in FIG. 2, a plurality of the devices according to the invention can be arranged connected to a reactor 8.

Advantageously, the feed line 1 has in the region of the arcuate drain line 2 a closable opening 7. This permits access to the interior of the device and allows internal cleaning. In the case of a large number of solids-laden gases, deposition or caking-on occurs in devices in which the gas is passed. Simple elimination of deposits or inspection of the device is possible through the opening 7.

The number of devices for coarse separation per generator of solids-laden gases is defined as required. Industrially conventional reactors can be equipped with 4 to 8 devices for coarse separation. FIG. 2 shows an oblique line link 10 to a reactor 8 with a perpendicular feed line 1 and a perpendicular, blind hole-type projection 5. However, the projection 5 can also run in the axial extension of the line link 10.

The solid particles 11 separated in the cyclone 9 can be returned to the reactor via an injector (not shown).

Figure 3:
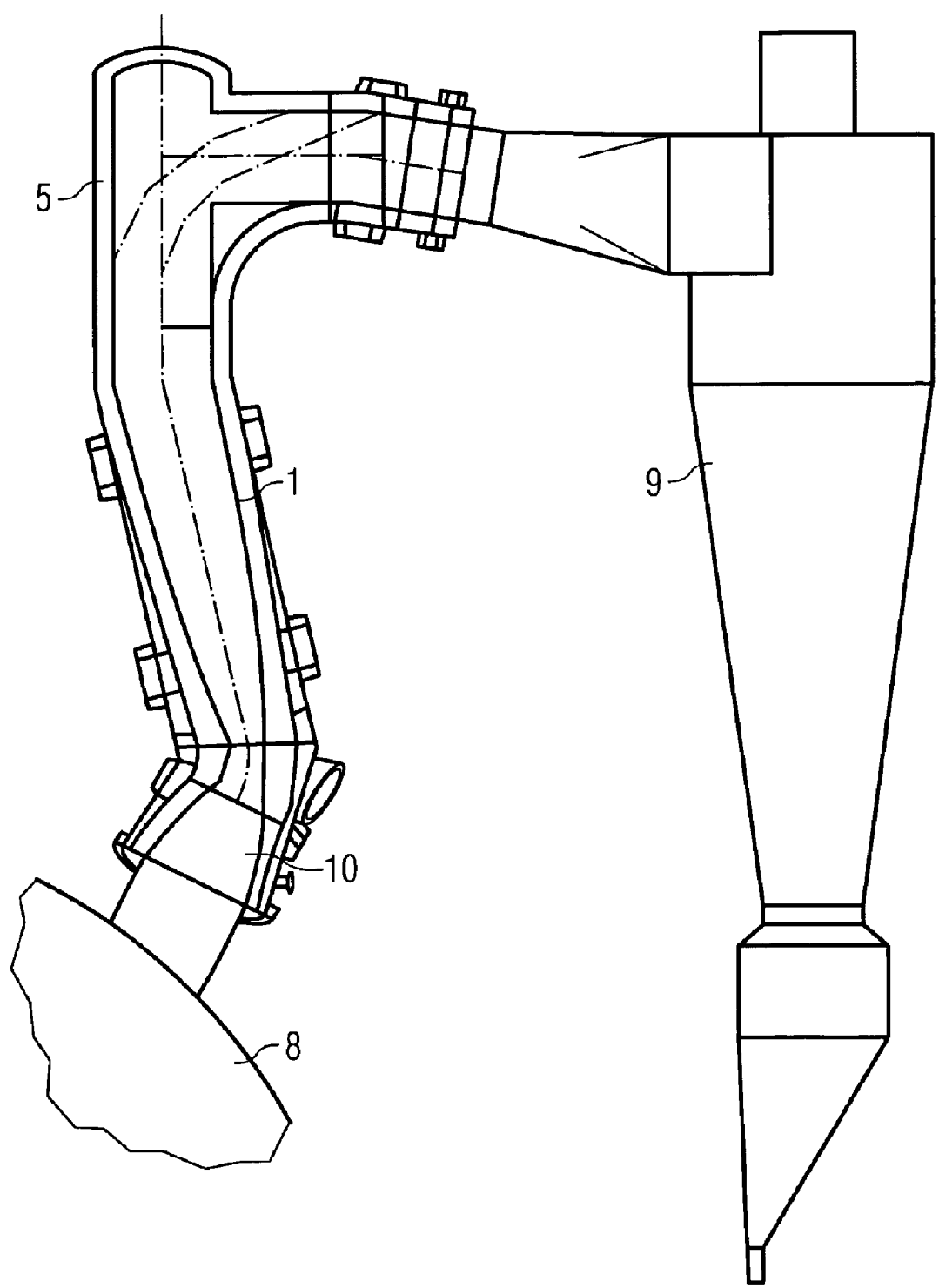
FIG. 3 shows the arrangement of the device according to the invention above a reactor for the thermal/metallurgical treatment of a material with an obliquely arranged feed line.

According to FIG. 3, the feed line 1 is arranged obliquely, thus producing an S-shaped line from the reactor into the device, allowing the deflection to be further reinforced.

The invention claimed is:

1. A device for coarse separation of solid particles from solids-laden gases from a reactor for treatment of particulate feed materials by means of treatment gases, the device comprising:
   a vertically upwardly extending or obliquely upwardly extending feed line receiving treatment gases and solid particles from the reactor; and a drain line which is arcuate at least along certain portions thereof; the feed line having a lower end which receives the solids-laden gases, the feed line has a closed upper end,
   the arcuate drain line being arranged on and arcuately curving off the feed line at a position along the feed line below the closed upper end forming a blind hole-type line projection in the feed line above the position along the feed line and the arcuate connection being shaped for separating solid particles from the treatment gases, and
   the arcuate drain line being curved in the form of an arc of a circle or an arc constructed from straight segments, having a radius of 3-5 times a clear width of the arcuate drain line.

2. The device as claimed in claim 1, wherein the position of the arcuate drain line along the feed line is selected such that a length of the line projection above the position along the feed line corresponds to a height of the arcuate drain line.

3. The device as claimed in claim 2, wherein the length of the line projection corresponds to 0.3-3 times the clear width of the feed line.

4. The device as claimed in claim 3, wherein the clear widths of the feed line and the arcuate drain line are the same.

5. The device as claimed in claim 1, wherein at least one of the feed line and/or the arcuate drain line has a circular-cross section.

6. The device as claimed in claim 1, wherein the blind hole-type line projection is closed by a lid having a flat inner surface arranged horizontally and/or normally to an axis of the feed line.

7. The device as claimed in claim 1, further comprising, for cooling the prepurified gas, a connection in the drain line for introducing a cooling gas flow into the prepurified gas.

8. The device as claimed in claim 1, further comprising a closable opening in the feed line, in a region of the location of the arcuate drain line, for enabling internal cleaning, in the drain line.

9. A method for coarse separation of solid particles from solids-laden gases from a reactor for the treatment of particulate feed materials by means of treatment gases in a device as claimed in claim 1, the method comprising,
   supplying solids-laden gases via one end of the feed line connected to the reactor and closing the feed line at another end thereof, wherein the arcuate drain line is located along the feed line in order to form a blind hole-type line projection above the location and the projection is for receiving solid particles,
   carrying solids introduced into the feed line owing to inertia of the solids, into the line projection and at least partly separating the solids from the gas,
   drawing off the gas, with remaining solids, via the drain line, and casting back separated solids from the closed end of the feed line projection and casting the separated solids back into the feed line.

10. The method as claimed in claim 9, further comprising discharging the solids separated in the line projection into the reactor, owing to gravity, via the feed line.

11. The method as claimed in claim 10, wherein during the discharge of the separated solids via the feed line, a velocity of fall of the solids in the line projection is greater than a gas velocity of the solids-laden gas in the feed line.

12. The method as claimed in claim 10, further comprising adding a cooling gas flow to the prepurified gas for cooling.

13. The method as claimed in claim 10, further comprising, further separating solids remaining in the prepurified gas in a further separating means.

14. The method as claimed in claim 10, wherein the particulate feed materials treated in the reactor are fine ores.

15. The method as claimed in claim 10, further comprising treating the particulate feed materials in a fluidization zone before introducing the gases into the feed line.

16. The method as claimed in claim 10, further comprising supplying the solids-laden treatment gases via the feed line such that solids introduced into the feed line are carried, owing to their inertia, into the feed line projection and are there at least partly separated from the treatment gas, drawing off prepurified gas via the drain line and returning the solids separated in the line projection, owing to gravity, to the reactor via the feed line.

17. The method as claimed in claim 16, further comprising separating the solids remaining in the prepurified treatment gas in a further separator, and returning these solids to the reactor via an injector.

18. The method as claimed in claim 10, wherein the treatment of the feed materials by treatment gases is a reduction method.

19. The device as claimed in claim 1, further comprising a separator in the drain line for separating remaining solids from the prepurified gas.

20. The device as claimed in claim 2, wherein the length of the line projection corresponds to 0.5-1 times the clear width of the feed line.

21. The device as claimed in claim 1, wherein the clear widths of the feed line and the arcuate drain line are the same.

22. The device as claimed in claim 5, wherein the feed and drain lines has, in the region in which the blind hole-type projection opens into the arc, flat wall portions comprising ribs for reinforcement.

23. The device as claimed in claim 6, wherein the blind hole-type line projection is closed by a lid having an arched surface corresponding to a dished bottom or a spherical cap.

* * * * *